US012694561B2

(12) United States Patent
Takagi

(10) Patent No.: US 12,694,561 B2
(45) Date of Patent: Jul. 28, 2026

(54) IMAGE PROCESSING DEVICE, IMAGE PROCESSING METHOD AND IMAGE PROCESSING SYSTEM

(71) Applicant: BRIDGESTONE SPORTS CO., LTD., Tokyo (JP)

(72) Inventor: Hiroo Takagi, Chichibu (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 286 days.

(21) Appl. No.: 18/475,209

(22) Filed: Sep. 27, 2023

(65) Prior Publication Data

US 2024/0112365 A1 Apr. 4, 2024

(30) Foreign Application Priority Data

Sep. 28, 2022 (JP) ................................. 2022-155587

(51) Int. Cl.
*G06T 7/73* (2017.01)
*A63B 24/00* (2006.01)
(Continued)

(52) U.S. Cl.
CPC ............ *G06T 7/73* (2017.01); *A63B 24/0006* (2013.01); *G06T 7/60* (2013.01);
(Continued)

(58) Field of Classification Search
CPC ... G06T 7/73; G06T 7/60; G06T 2207/10016; G06T 2207/30196; G06T 2207/30221;
(Continued)

(56) References Cited

U.S. PATENT DOCUMENTS 10,213,645 B1 * 2/2019 Wu ..................... A63B 24/0003
10,258,850 B2 * 4/2019 Solheim ................... G06T 7/60
(Continued)

FOREIGN PATENT DOCUMENTS

JP 2004208785 A 7/2004
JP 2017169203 A * 9/2017
WO WO-2014157340 A1 * 10/2014 ............. G01B 11/02

OTHER PUBLICATIONS

Measurement of Angular Motion in Golf Swing by a Local Sensor at the Grip End of a Golf Club. Ueda et al. (Year: 2013).*

*Primary Examiner* — Delomia L Gilliard
(74) *Attorney, Agent, or Firm* — KENJA IP LAW PC

(57) ABSTRACT

The image processing device comprises: a position identification section for identifying positions of two reference points and a position of physical characteristic point of the subject in the moving image; an angle acquisition section for obtaining an angle of a line segment connecting the two reference points with respect to the image plane; a conversion ratio calculation section for calculating a conversion ratio indicating a ratio between the length in the moving image and the length in real space; and a coordinate calculation section for calculating position coordinates of at least one of: the two reference points and the physical characteristic point of the subject in the image plane in the real space, based on the calculated conversion ratio and at least one of: the identified positions of the two reference points and the identified position of the physical characteristic point of the subject.

9 Claims, 8 Drawing Sheets

(51) Int. Cl.
    *A63B 102/32*        (2015.01)
    *G06T 7/60*         (2017.01)

(52) U.S. Cl.
    CPC ................. *A63B 2024/0009* (2013.01); *A63B 2024/0012* (2013.01); *A63B 2102/32* (2015.10); *A63B 2220/05* (2013.01); *A63B 2220/806* (2013.01); *G06T 2207/10016* (2013.01); *G06T 2207/30196* (2013.01); *G06T 2207/30221* (2013.01)

(58) Field of Classification Search
    CPC ................ G06T 7/246; A63B 24/0006; A63B 2024/0009; A63B 2024/0012; A63B 2102/32; A63B 220/05; A63B 2220/806; G09B 19/0038
    See application file for complete search history.

(56)                References Cited

U.S. PATENT DOCUMENTS

| | | | | |
|---|---|---|---|---|
| 11,790,536 | B1 * | 10/2023 | Berme | G06T 7/70 |
| | | | | 382/107 |
| 11,948,334 | B2 * | 4/2024 | Shaw | G06T 7/55 |
| 12,172,066 | B2 * | 12/2024 | Syed | A63B 24/0003 |
| 2011/0299729 | A1 * | 12/2011 | Dawe | G06T 7/246 |
| | | | | 382/103 |
| 2016/0086347 | A1 * | 3/2016 | Ishihara | H04N 23/80 |
| | | | | 348/207.1 |
| 2020/0320719 | A1 * | 10/2020 | Lee | G06T 7/20 |
| 2022/0273984 | A1 * | 9/2022 | Lee | G06V 40/10 |
| 2022/0284628 | A1 * | 9/2022 | Tuxen | H04N 23/69 |

* cited by examiner

FIG. 4B

Start

↓

Identify two reference points and a
physical characteristic point of subject.     ～S11

↓

Obtain an angle of a line segment connecting the
two reference points with respect to image plane     ～S12

↓

Calculate a conversion ratio     ～S13

↓

Calculate position coordinates     ～S14

↓

End

IMAGE PROCESSING DEVICE, IMAGE PROCESSING METHOD AND IMAGE PROCESSING SYSTEM

TECHNICAL FIELD

The present disclosure relates to an image processing device, an image processing method, and an image processing system.

BACKGROUND

A system has been conventionally used in golf lessons, etc., in which various measurements are taken while a subject (a golfer) is performing a swing motion of a club, and the swing is evaluated based on the measurement results. One of the items measured to evaluate the swing is position coordinates of physical characteristic points of the subject and given reference points on the club. To obtain these position coordinates, it is conceivable to use a method of calculating the length of the object based on the length of a known reference object in an image taken of the object.

For example, Patent Document 1 describes a technique for calculating the dimensions of subject's body parts based on the size of a reference object of known size in an image taken of the subject and the reference object. In addition, Patent document 2 describes a technique for calculating the length of an object based on the distance between markers in an image taken of the object, where the multiple markers are attached to the object in such a way that the distance between each marker is known.

CITATION LIST

Patent Literature

PTL 1: U.S. Pat. No. 10,258,850 B2
PTL 2: WO2014/157340 A1

SUMMARY

When determining the position of the physical characteristic point of the subject, etc., performing a swing motion, it is conceivable to estimate the position of the physical characteristic point of the subject, etc., based on the length of a reference object (e.g., a golf club) in the image, using the techniques described in Patent Documents 1 and 2. Here, consider the case illustrated in FIG. 7A, where the position of the physical characteristic point of the subject 1 is estimated based on the length of a club 2, from an image taken from the front of the swing motion of the club 2 performed by the subject 1. In this case, as illustrated in FIG. 7B, when the subject performing the swing motion is viewed from the direction of a flying ball line, the length of the club 2 in the image is the length projected on the image plane because the club 2 is not parallel to the image plane. Therefore, simply estimating the position of the physical characteristic point of the subject, etc., based on the length of the club 2 in the image will not yield correct values.

The purpose of the present disclosure, made in view of the above problems, is to provide an image processing device, an image processing method, and an image processing system that can improve the accuracy of calculation, from a moving image taken of a subject performing a swing motion of a club, of the position coordinates in an image plane of the moving image in real space.

The image processing device as an aspect of this disclosure is an image processing device that calculates, from a moving image of a subject performing a swing motion of a club taken by a single image acquisition device, position coordinates in an image plane of the moving image in real space, wherein the device comprises a processor, and the processor is configured to: identify positions of two reference points and a position of physical characteristic point of the subject in the moving image, obtain an angle of a line segment connecting the two reference points with respect to the image plane, calculate a conversion ratio indicating a ratio between the length in the moving image and the length in the real space, based on the distance between the two reference points in the moving image, the obtained angle by the above, and the distance between the two reference points in the real space, and calculate position coordinates of at least one of: the two reference points and the physical characteristic point of the subject in the image plane in the real space, based on the calculated conversion ratio and at least one of: the identified positions of the two reference points and the identified position of the physical character-istic point of the subject.

The image processing method as an aspect of this disclosure is an image processing method using an image processing device that calculates, from a moving image of a subject performing a swing motion of a club taken by a single image acquisition device, position coordinates in an image plane of the moving image in real space, wherein the method includes: identifying positions of two reference points and a position of physical characteristic point of the subject in the moving image, obtaining an angle of a line segment connecting the two reference points with respect to the image plane, calculating a conversion ratio indicating a ratio between the length in the moving image and the length in the real space, based on the distance between the two reference points in the moving image, the obtained angle, and the distance between the two reference points in the real space, and calculating position coordinates of at least one of: the two reference points and the physical characteristic point of the subject in the image plane in the real space, based on the calculated conversion ratio and at least one of: the identified positions of the two reference points and the identified position of the physical characteristic point of the subject.

The image processing system as an aspect of this disclosure is an image processing system comprising a single image acquisition device that takes a subject performing a swing motion of a club, and an image processing device that calculates, from a moving image taken by the single image acquisition device, position coordinates in an image plane of the moving image in real space, wherein the image processing device comprises: a processor, and the processor is configured to: identify positions of two reference points and a position of physical characteristic point of the subject in the moving image, obtain an angle of a line segment connecting the two reference points with respect to the image plane, calculate a conversion ratio indicating a ratio between the length in the moving image and the length in the real space, based on the distance between the two reference points in the moving image, the obtained angle, and the distance between the two reference points in the real space, and calculate position coordinates of at least one of: the two reference points and the physical characteristic point of the subject in the image plane in the real space, based on the calculated conversion ratio and at least one of: the identified positions of the two reference points and the identified position of the physical characteristic point of the subject.

According to the image processing device, the image processing method, and the image processing system of the present disclosure, it is possible to improve the accuracy of calculation, from a moving image of a subject performing a swing motion of a club, of the position coordinates in an image plane of the moving image in real space.

BRIEF DESCRIPTION OF THE DRAWINGS

In the accompanying drawings:

FIG. 4B is a diagram for explaining the calculation of a conversion ratio by the conversion ratio calculation section illustrated in FIG. 1.

DETAILED DESCRIPTION

Embodiment(s) of the present disclosure will be described below with reference to the drawings.

Figure 1:
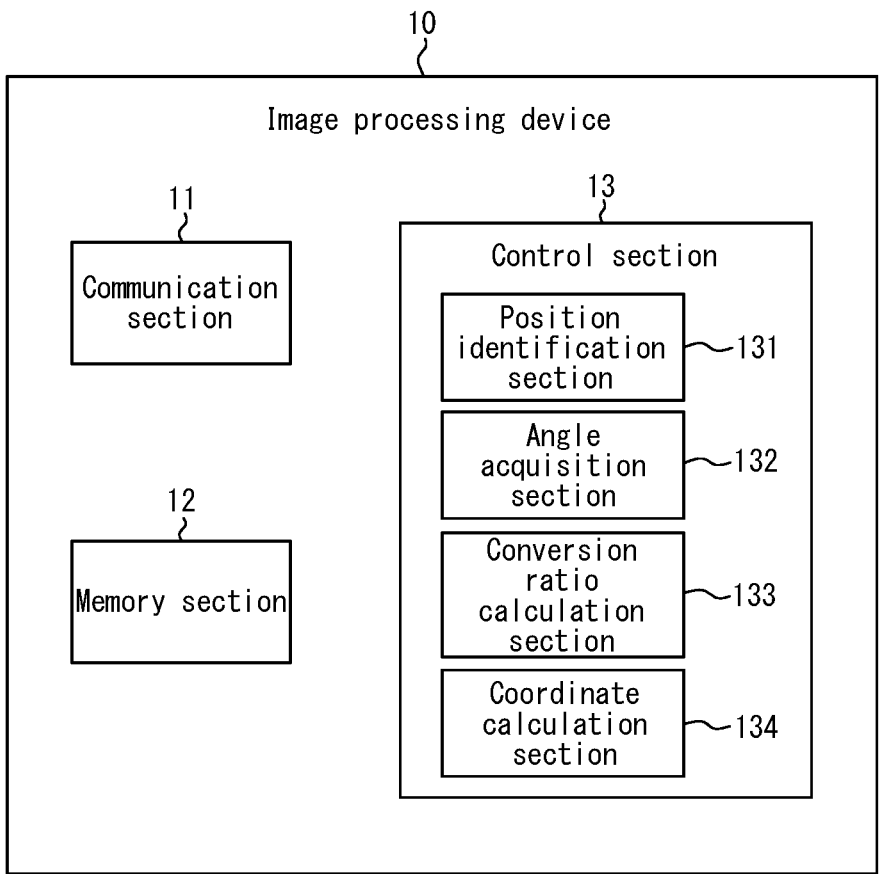
FIG. 1 illustrates an example configuration of an image processing device in accordance with one embodiment of the present disclosure.
Figure 7A:
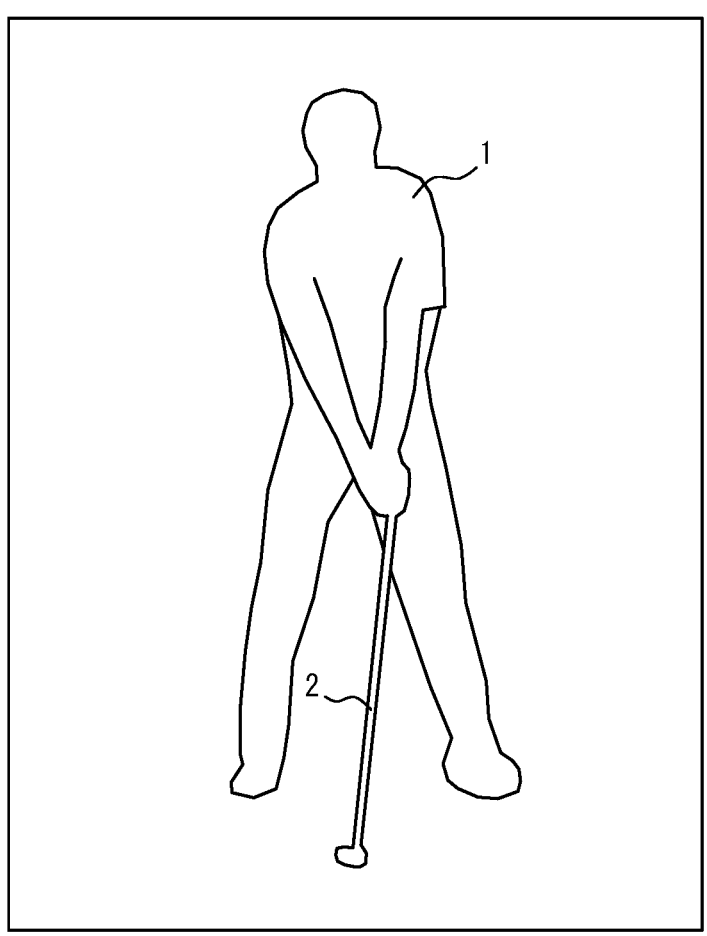
FIG. 7A is a diagram for explaining the inclination of a club in an image taken of a subject performing a swing motion.
Figure 7B:
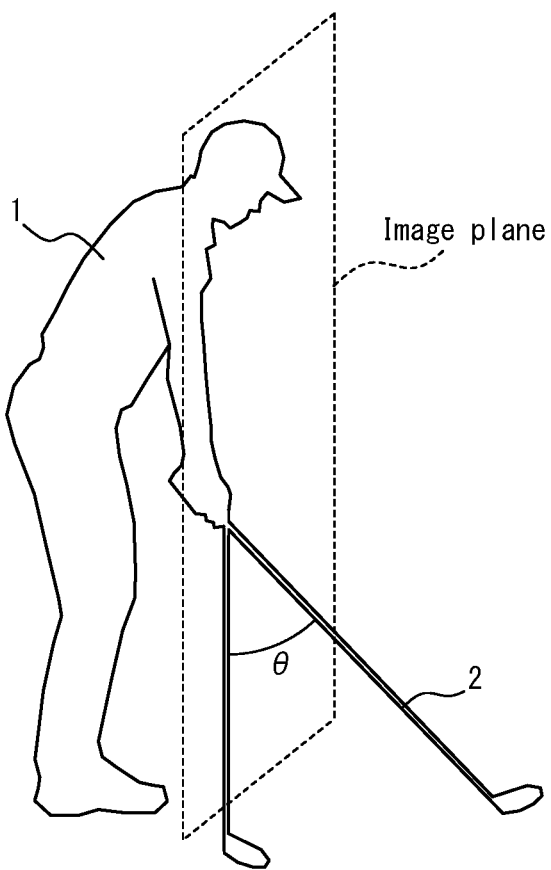
FIG. 7B is a diagram for explaining the inclination of a club in an image taken of a subject performing a swing motion.

FIG. 1 illustrates an example configuration of an image processing device 10 in accordance with one embodiment of the present disclosure. The image processing device 10 according to this embodiment calculates, from a moving image of a subject 1 performing a swing motion of a club 2, position coordinates in an image plane of the moving image in real space, as illustrated in FIG. 7A.

As illustrated in FIG. 1, the image processing device 10 comprises a communication section 11, a memory section 12, and a control section 13.

The communication section 11 comprises one or more communication modules. The communication section 11 may include a communication module compatible with mobile communication standards such as 4G (4th Generation) and 5G (5th Generation), for example. The communication section 11 may include, for example, a communication module that supports the wireless LAN standard (IEEE 802.11 as an example). Also, the communication section 11 may include, for example, a communication module that supports the wired LAN standard.

The memory section 12 is one or more memories. The memory can be any memory, including but not limited to a semiconductor memory, a magnetic memory, or an optical memory. The memory section 12 is built into the image processing device 10 for example, but can also be configured to access to the image processing device 10 externally via any interface.

The memory section 12 stores various data used in various processes executed by the control section 13. The memory section 12 may also store results and intermediate data of various processes executed by the control section 13.

The control section 13 is one or more processors. The processor can be, for example, a general-purpose processor or a dedicated processor specialized for a particular processing, but is not limited to these and can be any processor. The control section 13 controls the overall operation of the image processing device 10.

The image processing device 10 may have the following software configuration. The memory section 12 stores one or more programs pertaining to the present disclosure, which are used to control the operation of the image processing device 10. The programs stored in the memory section 12, when read by the processor of the control section 13, causes the control section 13 to function as a position identification section 131, an angle acquisition section 132, a conversion ratio calculation section 133, and a coordinate calculation section 134.

The position identification section 131 is input with a moving image of the subject 1 performing a swing motion of a club 2 taken by a single imaging device (image acquisition device). The moving image is, for example, a video of the subject 1 performing a swing motion of a club 2 taken from the front or a video of the subject 1 performing a swing motion of a club 2 taken from the direction of a flying ball line. By using such moving image, it is possible to calculate the position coordinates of the physical characteristic points, etc., as viewed from the front or side (the direction of a flying ball line) of the subject 1.

The moving image is taken with the distance from the imaging device to the subject 1 or to a golf ball at a predetermined distance. Alternatively, the distance from the imaging device to the subject 1 or to the golf ball at the time the imaging device captures the image is measured and input to the image processing device 10. Therefore, the distance from the imaging device to the subject 1 or to the golf ball at the time the imaging device captures the moving image is known.

In addition, for example, the moving image is taken with the height from the imaging device to the ground at a predetermined height. Alternatively, the height of the imaging device from the ground at the time the imaging device captures the image is measured and input to the image processing device 10. Therefore, the height of the imaging device from the ground at the time the imaging device captures the moving image is known.

The position identification section 131 identifies the positions of the two reference points and the physical characteristic point of the subject 1 in the input moving image.

The position identification section 131 identifies, for example, the position of a grip end of the club 2 and the position of the center of the head of the club 2 as the two reference points. Also, the position identification section 131 identifies, for example, the center of both wrists of the subject 1 and the center of the head of the club 2 as the two reference points. By using the grip end of the club 2, the center of the head, and the center of both wrists of the subject 1 as the two reference points, the two reference points can be set without separately installing reference objects, etc. However, the grip end of the club 2 may be hidden by the hand of the subject 1, making it difficult to identify its position. Therefore, the reference point can be more accurately identified by identifying the position of the center of both wrists of the subject 1, instead of the position of the grip end of the club 2, as the position of the reference point.

In the following, the distance between the two reference points is assumed to be known. The distance between the two reference points may be set to a predetermined fixed value or may be entered by the subject 1 or an instructor. When the two reference points are the grip end and the center of the head of the club 2, a typical length of the club 2 (e.g., 45.25 inches) may be set as the distance between the two reference points. Also, when the two reference points are the grip end and the center of the head of the club 2, the distance between the two reference points may be set to a value entered by the subject 1 or others, or to a value selected from among several candidates (e.g., 45.00, 45.25, 45.50 inches).

When the two reference points are the grip end of the club 2 and the center of both wrists of the subject 1, the distance between the two reference points may be, for example, the general length from the grip end of the club 2 to the center of both wrists of the subject 1 (e.g., 45 inches). Also, when the two reference points are the grip end of the club 2 and the center of both wrists of the subject 1, the distance between the two reference points is set to a value selected from among several candidates (e.g., shorter (44 inches), normal (45 inches), longer (46 inches)) according to the grip position of the subject 1.

The position identification section 131 uses any object detection technique that can detect the head and the grip end of the club 2 or the wrist of the subject 1 from the moving image to identify the position of the two reference points as described above. Since such object detection techniques are not directly related to this disclosure, a detailed description is omitted.

The position identification section 131 also identifies the positions of joints of the subject 1 (e.g., shoulders, elbows, wrists, hips, knees, and ankles), for example, as the physical characteristic point of the subject 1. In addition, the position identification section 131 also identifies the positions other than joints of the subject 1 (e.g., ears, nose, eyes, head, and toes) as the physical characteristic point of the subject 1. The position identification section 131 may identify the position of the golf ball.

The position identification section 131 identifies the position of the physical characteristic point of the subject 1 as described above, for example, using any posture estimation technique. Since such posture estimation techniques are not directly related to this disclosure, a detailed description is omitted.

The angle acquisition section 132 obtains an angle θ of a line segment connecting the two reference points identified by the position identification section 131 with respect to the image plane of the moving image in real space.

The angle acquisition section 132 obtains the angle θ, for example, by an external input (e.g., input by the subject 1 or an instructor). In this way, the angle θ can be obtained more simply.

In addition, the angle acquisition section 132 measures the angle θ from an image of the subject 1 performing a swing motion taken from a different direction than the moving image input to the position identification section 131.

Figure 2A:
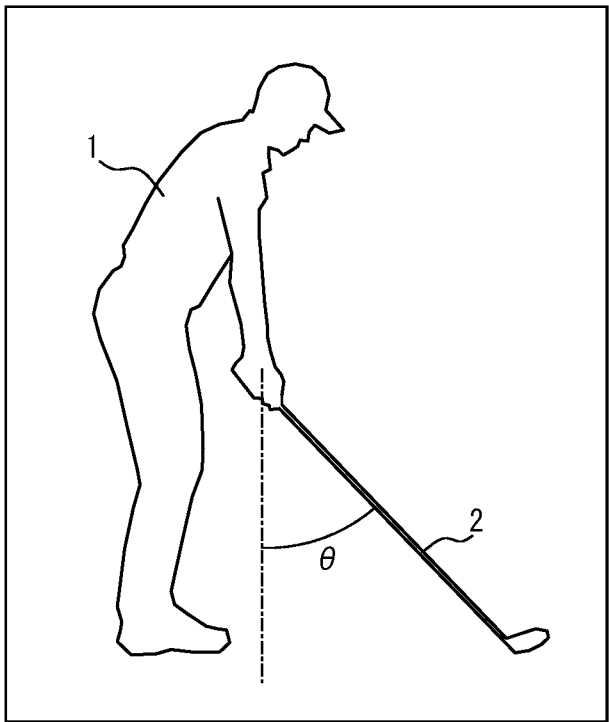
FIG. 2A schematically illustrates an image of a subject performing a swing motion, taken from the direction of a flying ball line.

For example, if the image input to the position identification section 131 is an image of the subject 1 performing a swing motion taken from the front, the angle acquisition section 132 measures the angle θ from an image of the subject 1 performing a swing motion taken from behind in the direction of the flying ball line (image at address), as illustrated in FIG. 2A.

Figure 2B:
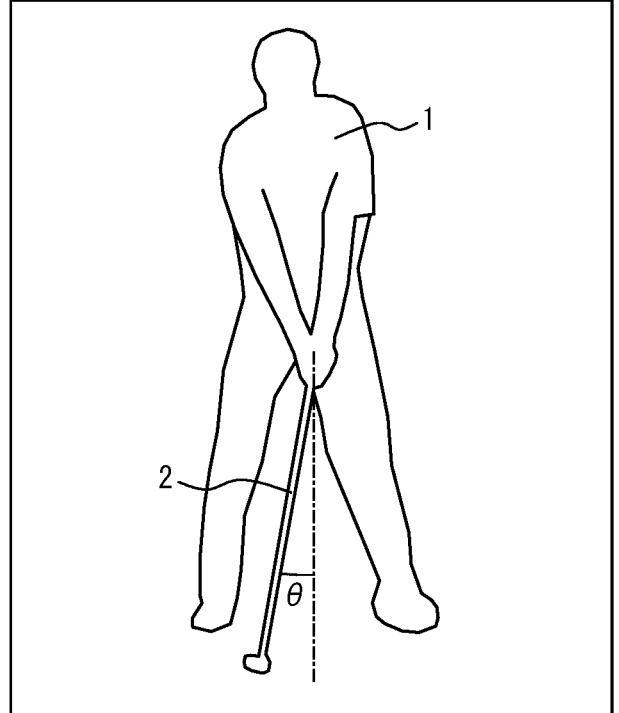
FIG. 2B schematically illustrates an image of a subject performing a swing motion, taken from the front.

As well as that, for example, if the image input to the position locating section 131 is an image of the subject 1 performing a swinging motion taken from the direction of the flying ball, the angle acquisition section 132 measures the angle θ from an image of the subject 1 performing the swing motion taken from the front (image at address), as illustrated in FIG. 2B.

By measuring the angle θ from an image of the subject 1 performing a swing motion from a different direction than the moving image input to the position identification section 131, a more accurate angle θ can be obtained. The angle θ may also be obtained from an image of a different swing than the current swing.

In addition, the angle acquisition section 132 may estimate the angle θ based on the height of the subject 1 or the length of body parts of the subject 1 in real space, as input by the subject 1 or others. In general, it is known that the angle θ of the club 2 at address tends to be proportional to the height of the subject 1. Therefore, the angle acquisition section 132 may estimate the angle θ by inputting the height of the subject 1 into the pre-calculated regression equation showing the relationship between the height and the angle θ.

Figure 3:
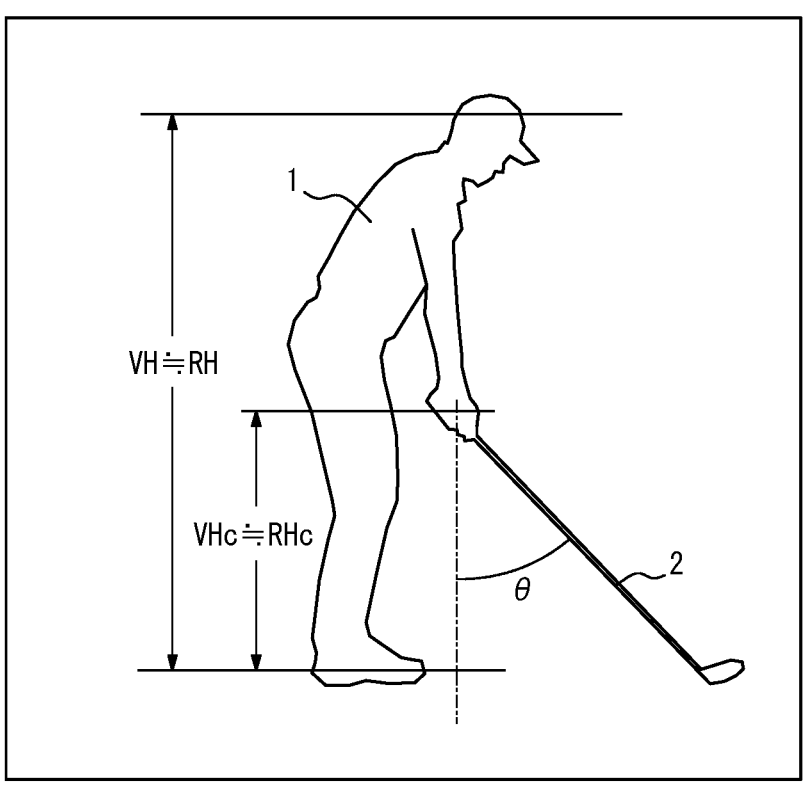
FIG. 3 is a diagram for explaining the calculation of an angle by the angle acquisition section illustrated in FIG. 1.

The angle acquisition section 132 may also estimate the angle θ based on the length of body parts of the subject 1, e.g., from a wrist to an ankle. In this case, as illustrated in FIG. 3, it is assumed that the height VH of the subject 1 in the image of the subject 1 at address, taken from behind and in the direction of the flying ball line is approximately equal to the height RH of the subject 1 in real space (VH≅RH). Next, the angle acquisition section 132 calculates the wrist-to-ankle length RHc of the subject 1 in real space based on the height VH of the subject 1 in the image, the wrist-to-ankle length VHc of the subject 1 in the image, and the input actual height RH of the subject 1. The angle acquisition section 132 then estimates the angle θ based on the wrist-to-ankle length RHc of the subject 1 in real space and the length of the club 2, as illustrated in FIG. 3. The angle acquisition section 132 may estimate the angle θ by inputting the wrist-to-ankle length RHc of the subject 1 into the pre-calculated regression equation showing the relationship between the wrist-to-ankle length and the angle θ.

By estimating the angle θ based on the height of the subject 1 or the length of body parts of the subject 1, a more accurate angle θ can be obtained.

Referring again to FIG. 1, the conversion ratio calculation section 133 calculates the conversion ratio P based on the distance between the two reference points in the input moving image, the angle θ obtained by the angle acquisition section 132, and the distance between the two reference points in real space. Here, the conversion ratio P is a value indicating the ratio between the length in the moving image and the length in the real space.

Figure 4A:
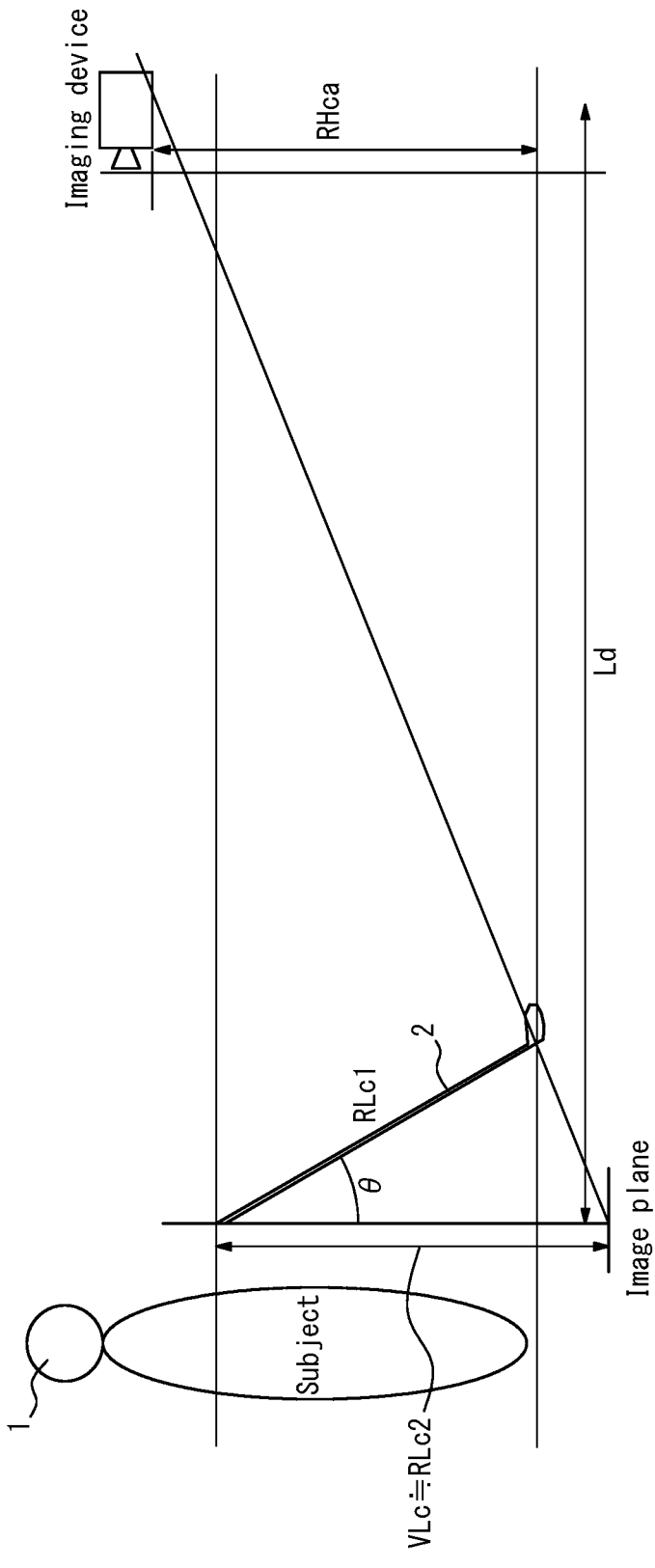
FIG. 4A is a diagram for explaining the calculation of a conversion ratio by the conversion ratio calculation section illustrated in FIG. 1.

FIG. 4A is a schematic diagram of the subject 1 performing a swing motion of the club 2, taken from the front of the subject 1 using the imaging device, as viewed from the direction of the flying ball. In FIG. 4A, it is assumed that the two reference points are the grip end of the club 2 and the center of the shaft. Also, in FIG. 4A, it is assumed that the distance from the imaging device to the subject 1 is known.

In FIG. 4A, VLc represents the distance between the two reference points in the moving image (in pixels), and RLc1 represents the length of the club 2 in real space, RLc2 represents the length of the club 2 when projected onto the image plane in real space, Ld represents the distance from the imaging device to the subject 1, and RHca represents the height of the imaging device from the ground. As mentioned above, the length RLc1 of the club 2 in real space is input and known by subject 1 and others. In addition, imaging is being performed with the distance Ld from the imaging device to the subject 1 and the height RHca of the imaging device from the ground in a known state.

The conversion ratio calculation section 133 calculates the conversion ratio P based on the following formula (1).

$$P \times VL_c = RL_c1 \times \cos\theta - \frac{RL_c1 \times \sin\theta}{Ld - RL_c1 \times \sin\theta} \times RH_{Ca} \qquad \text{Formula (1)}$$

Figure 4B:
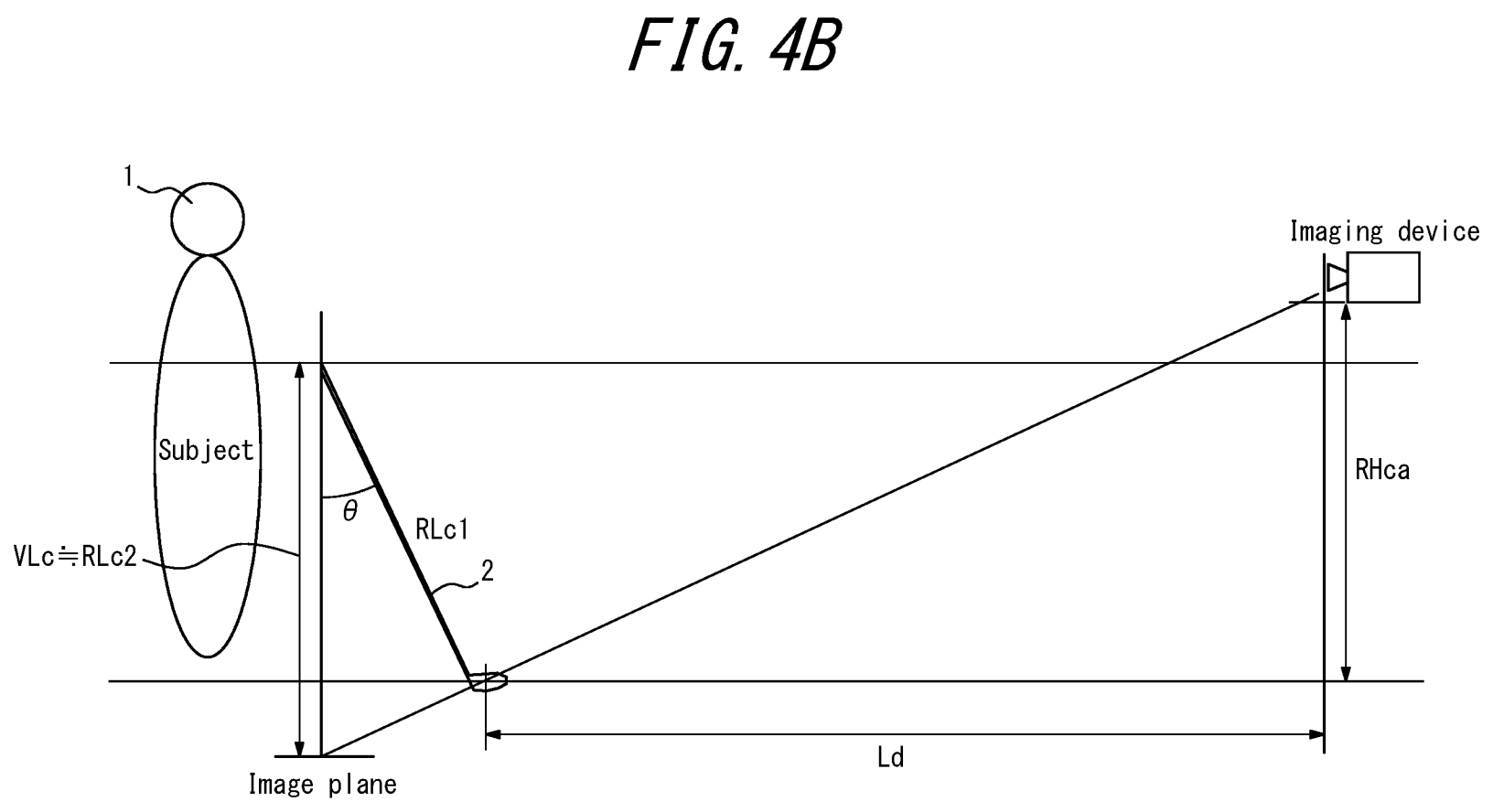

FIG. 4B is a schematic diagram of the subject 1 performing a swing motion of the club 2, taken from the front of the subject 1 using the imaging device, as viewed from the direction of the flying ball. In FIG. 4B, it is assumed that the two reference points are the grip end of the club 2 and the center of the shaft. Also, in FIG. 4B, it is assumed that the distance from the imaging device to the ball is known.

In FIG. 4B, VLc represents the distance between the two reference points in the moving image (in pixels), and RLc1 represents the length of the club 2 in real space, RLc2 represents the length of the club 2 when projected onto the image plane in real space, Ld represents the distance from the imaging device to the ball, and RHca represents the height of the imaging device from the ground. As mentioned above, the length RLc1 of the club 2 in real space is input and known by subject 1 and others. In addition, imaging is being performed with the distance Ld from the imaging device to the ball and the height RHca of the imaging device from the ground in a known state.

The conversion ratio calculation section 133 calculates the conversion ratio P based on the following formula (2).

$$P \times VL_c = RL_c1 \times \cos\theta + \frac{RL_c1 \times \sin\theta}{Ld} \times RH_{ca} \qquad \text{Formula (2)}$$

Referring again to FIG. 1, the coordinate calculation section 134 calculates the position coordinates of at least one of: the two reference points and the physical characteristic point of the subject 1 in the image plane in real space based on the conversion ratio P calculated by the conversion ratio calculation section 133 and at least one of: the positions of the two reference points and the position of the physical characteristic point of the subject 1 identified by the position identification section 131.

The coordinate calculation section 134 outputs the calculation results of the position coordinates to an evaluation device (not illustrated) that evaluates the swing motion. The evaluation device may be provided within the image processing device 10 or outside of the image processing device 10.

The evaluation items of the swing motion using the position coordinates calculated by the coordinate calculation section 134 include, for example, the chronological positions in a two-dimensional plane for the joints of the subject 1, such as shoulders, elbows, wrists, hips, knees, and ankles. Another evaluation item for the swing motion is the amount of head movement of the subject 1 between address and impact. Yet another evaluation item of the swing motion is the speed of the head of the club 2 at impact (head speed). Yet another evaluation item of the swing motion is the center of gravity of the subject 1's body at the top, at halfway down, and at impact, and the amount of shift in the center of gravity. Yet another evaluation item of the swing motion is the position of the ball in relation to subject 1's body at address. In this case, the position of the ball should also be detected from the input moving image. Yet another evaluation of the swing motion is the chronological floor reaction forces on the left and right feet of the subject 1. The specific evaluation methods for these evaluation items are not directly related to this disclosure, so a detailed explanation is omitted.

Figures 5, 6:
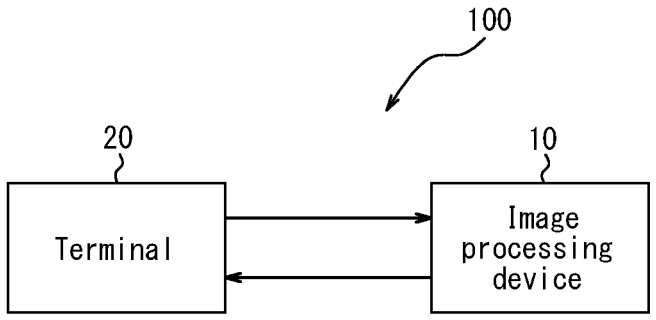
FIG. 5 is a flowchart illustrating an example of the operation of the image processing device illustrated in FIG. 1.
FIG. 6 illustrates an example configuration of an image processing system in accordance with one embodiment of the present disclosure.

FIG. 5 is a flowchart illustrating an example of the operation of the image processing device 10, and a diagram explaining the image processing method using the image processing device 10 according to this embodiment.

The position identification section 131 identifies the positions of the two reference points and the position of the physical characteristic point of the subject 1 in the moving image, taken by a single imaging device (the image acquisition device), of the subject 1 performing a swing motion of the club 2 (Step S11). As described above, the position identification section 131 uses any object detection techniques and any posture estimation techniques to identify the positions of the two reference points and the position of the physical characteristic point of the subject 1.

The angle acquisition section 132 obtains an angle θ of a line segment connecting the two reference points, identified by the position identification section 131, with respect to the image plane (Step S12). As mentioned above, the angle acquisition section 132 obtains the angle θ, for example, from an external input. Also, the angle acquisition section 132 obtains (estimates) the angle θ, for example, from an image of the subject 1 performing a swing motion taken from a different direction than the input moving image. By measuring the angle θ from an image of the subject 1 performing a swing motion taken from a different direction than the input moving image, a more accurate angle θ can be obtained. In addition, the angle acquisition section 132 obtains (estimates) the angle θ based on, for example, the height of the subject 1 or the length of a body part of the subject 1 in real space. By estimating the angle θ based on the height of the subject 1 or the length of a body part of the subject 1, a more accurate angle θ can be obtained.

The conversion ratio calculation section 133 calculates the conversion ratio P based on the distance between the two reference points in the moving image, the angle θ obtained by the angle acquisition section 132, and the distance between the two reference points in real space (Step S13). As described above, the conversion ratio calculation section 133 calculates the conversion ratio P based on the equation (1) described with reference to FIG. 4A or the equation (2) described with reference to FIG. 4B, etc.

The coordinate calculation section 134 calculates the position coordinates at least one of: the two reference points and the physical characteristic point of the subject 1 in the image plane in real space based on the conversion ratio P calculated by the conversion ratio calculation section 133 and at least one of: the positions of the two reference points and the position of the physical characteristic point of the subject 1 identified by the position identification section 131 (Step S14).

The control section 13 performs the aforementioned steps S11 through S14 in chronological order for the multiple images comprising the input moving image. In this way, the position coordinates of at least one of: the two reference points and the physical characteristic point of the subject 1 can be calculated chronologically.

In order to control the increase in processing load and reduce the occurrence of processing errors, it is desirable that the moving images to be processed in the control section 13 do not include images from periods other than the period during which the subject 1 performs the swing motion. In other words, the moving images to be processed is preferably those of a predetermined period of time in the swing motion by the subject 1 (e.g., from the address, through the top and impact, to the finish). Therefore, the control section 13 may extract moving images, to be processed, of a predetermined period in the swing motion by the subject 1 from the input moving images. In this way, the increase in processing load and the occurrence of processing errors can be reduced. Note, that the extraction of the moving images for example, of the period from the address to the finish in the moving images of the swing motion can be performed using any image recognition technology.

FIG. 6 illustrates an example of an image processing system 100 to which the image processing device 10 is applied.

As illustrated in FIG. 6, the image processing system 100 comprises an image processing device 10 and a terminal 20 as an image acquisition device.

The image processing device 10 and the terminal 20 can communicate via a network such as a mobile communication network or a wireless/wired LAN. The image processing device 10 is, for example, a server device on a network.

The terminal 20 is a user terminal used by the subject 1 or an instructor, and is e.g., a smartphone or a tablet terminal. The terminal 20 operates as an imaging device provided with an imaging function, and captures images of the subject 1 performing a swing motion. The terminal 20 then transmits the taken moving image to the image processing device 10. As mentioned above, the image to be processed by the image processing device 10 is preferably a moving image of a predetermined period of time in the swing motion by the subject 1 (e.g., from address to finish). The terminal 20 may, for example, extract moving images, from the taken moving images, for the period specified by the subject 1 or other subjects (e.g., from address to finish) and transmit them to the image processing device 10. In this way, the transmission capacity can be reduced, and the transmission time can be shortened compared to the case where the entire moving image is transmitted.

The image processing device 10 calculates the position coordinates of at least one of: the two reference points and the physical characteristic point of the subject 1 from the moving image taken by the single terminal 20, as described above. Based on the position coordinates calculated by the image processing device 10, the swing motion of the subject 1 is evaluated by an unillustrated evaluation device, and the evaluation results are transmitted to the terminal 20.

For example, the results of the various evaluation items described above are transmitted as evaluation results. Also, as an evaluation result, advice to the subject 1 based on the various evaluation results described above may be transmitted, for example. In addition, as an evaluation result, information on balls, clubs, etc. to be recommended to the subject 1 based on the various evaluation results described above may be transmitted. Further, as an evaluation result, a superimposed image in which the physical characteristic point of the subject 1 and the trajectory of the head of the club 2, etc., are superimposed on the moving image of the swing motion of subject 1 may be transmitted.

In this embodiment, the explanation is based on the example that the image processing device 10 comprises the position identification section 131, the angle acquisition section 132, the conversion ratio calculation section 133, and the coordinate calculation section 134, however, this disclosure is not limited to this. Some or all of the position identification section 131, the angle acquisition section 132, the conversion ratio calculation section 133, and the coordinate calculation section 134 may be provided in the terminal 20. Thus, the terminal 20 may operate as the image processing device 10 of this disclosure.

As explained above, the image processing device 10 according to this embodiment comprises a position identification section 131, an angle acquisition section 132, a conversion ratio calculation section 133, and a coordinate calculation section 134. The position identification section 131 identifies the positions of the two reference points and the position of the physical characteristic point of the subject 1 in the moving image. The angle acquisition section 132 obtains the angle θ of the line segment connecting the two reference points with respect to the image plane. The conversion ratio calculation section 133 calculates the conversion ratio P based on the distance between the two reference points in the moving image, the angle θ obtained by the angle acquisition section 132, and the distance between the two reference points in real space. The coordinate calculation section 134 calculates the position coordinates of at least one of: the two reference points and the physical characteristic point of the subject 1 in the image plane in real space, based on the conversion ratio P calculated by the conversion ratio calculation section 133 and at least one of: the positions of the two reference points and the position of the physical characteristic point of the subject 1 identified by the position identification section.

According to this configuration, since the position coordinates in the image plane can be calculated using a conversion ratio P that takes into account the angle θ of the line segment connecting the two reference points with respect to the image plane, it is possible to improve the accuracy of calculation, from a moving image taken of the subject 1 performing a swing motion, of the position coordinates in an image plane of the moving image in real space.

Although not specifically mentioned in the embodiment, a program may be provided to operate the computer as the image processing device 10. The program may also be recorded on a computer-readable medium. The computer-readable medium can be used to install the software on a computer. Here, the computer readable medium on which the program is recorded may be a non-transitory recording medium. The non-transitory recording medium is not limited, but may be, for example, a CD-ROM, a DVD-ROM, or other recording medium.

Although the embodiments are described as representative examples, it is clear to those skilled in the art that many changes and substitutions are possible within the intent and scope of this disclosure. Therefore, this disclosure should not be interpreted as limited by the embodiments described above, and various variations and changes are possible without departing from the scope of the claims. For example, it is possible to combine multiple component blocks described in the configuration diagram of the embodiment into one, or to split one component block.

The invention claimed is:

1. An image processing device that calculates, from a moving image of a subject performing a swing motion of a club taken by a single image acquisition device, position coordinates in an image plane of the moving image in real space, wherein the device comprises a processor, and
the processor is configured to:

identify positions of two reference points and a position of physical characteristic point of the subject in the moving image, obtain an angle of a line segment connecting the two reference points with respect to the image plane, calculate a conversion ratio indicating a ratio between the length in the moving image and the length in the real space, based on the distance between the two reference points in the moving image, the obtained angle, and the distance between the two reference points in the real space, and calculate position coordinates of at least one of: the two reference points and the physical characteristic point of the subject in the image plane in the real space, based on the calculated conversion ratio and at least one of: the identified positions of the two reference points and the identified position of the physical characteristic point of the subject.

2. The image processing device according to claim 1, wherein the moving image is a video of the subject taken from the front or a video of the subject taken from the direction of a flying ball line.

3. The image processing device according to claim 1, wherein the two reference points are the positions of a grip end and the center of a head of the club, or the center of both wrists of the subject and the center of the head of the club.

4. The image processing device according to claim 1, wherein the processor obtains the angle from an external input.

5. The image processing device according to claim 1, wherein the processor measures the angle from an image of the subject performing the swing motion taken from a different direction than the moving image.

6. The image processing device according to claim 1, wherein the processor estimates the angle based on the height of the subject or the length of a body part of the subject in the real space.

7. The image processing device according to claim 1, wherein the moving image is a video of a predetermined period of time in the swing motion.

8. An image processing method using an image processing device that calculates, from a moving image of a subject performing a swing motion of a club taken by a single image acquisition device, position coordinates in an image plane of the moving image in real space, wherein the method includes:

identifying positions of two reference points and a position of physical characteristic point of the subject in the moving image, obtaining an angle of a line segment connecting the two reference points with respect to the image plane, calculating a conversion ratio indicating a ratio between the length in the moving image and the length in the real space, based on the distance between the two reference points in the moving image, the obtained angle, and the distance between the two reference points in the real space, and calculating position coordinates of at least one of: the two reference points and the physical characteristic point of the subject in the image plane in the real space, based on the calculated conversion ratio and at least one of: the identified positions of the two reference points and the identified position of the physical characteristic point of the subject.

9. An image processing system comprising a single image acquisition device that takes a subject performing a swing motion of a club, and an image processing device that calculates, from a moving image taken by the single image acquisition device, position coordinates in an image plane of the moving image in real space, wherein the image processing device comprises:

a processor, and the processor is configured to:

identify positions of two reference points and a position of physical characteristic point of the subject in the moving image, obtain an angle of a line segment connecting the two reference points with respect to the image plane, calculate a conversion ratio indicating a ratio between the length in the moving image and the length in the real space, based on the distance between the two reference points in the moving image, the obtained angle, and the distance between the two reference points in the real space, and calculate position coordinates of at least one of: the two reference points and the physical characteristic point of the subject in the image plane in the real space, based on the calculated conversion ratio and at least one of: the identified positions of the two reference points and the identified position of the physical characteristic point of the subject.

\* \* \* \* \*